Aug. 1, 1961  W. H. LIEBMANN  2,994,567
DEVICE IN ROLLER GUIDEWAYS
Filed April 20, 1959  2 Sheets-Sheet 2
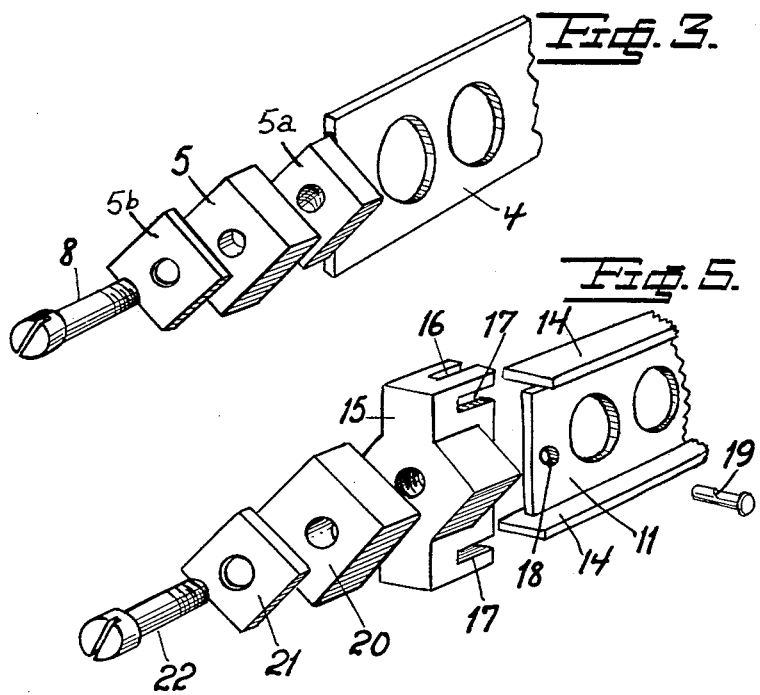
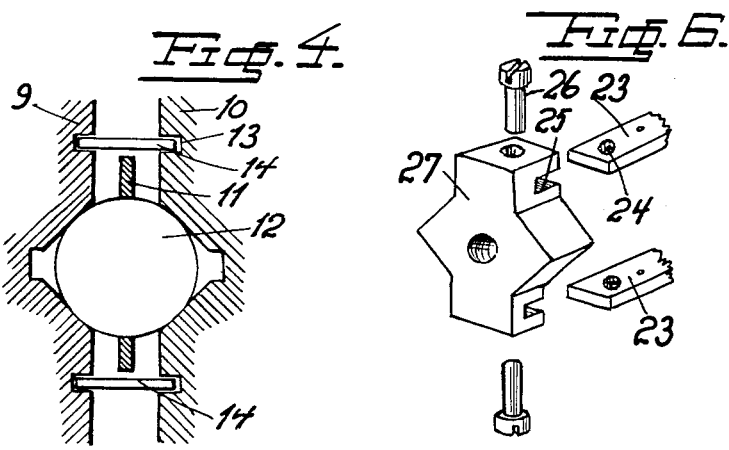
Inventor
Werner Hans Liebmann
By Pierce, Scheffler & Parker
Attorneys United States Patent Office 2,994,567
Patented Aug. 1, 1961

2,994,567
DEVICE IN ROLLER GUIDEWAYS
Warner Hans Liebmann, Karlskoga, Sweden, assignor to Aktiebolaget Johanssons Press- & Hejarverktyg, Bofors, Sweden, a company of Sweden
Filed Apr. 20, 1959, Ser. No. 807,575
Claims priority, application Sweden Apr. 28, 1958
5 Claims. (Cl. 308—3.5)

The present invention relates to a device in roller guideways which comprises two structures arranged for reciprocal motion in relationship to one another and roller bodies situated in a groove arranged between these structures. Such a device is common in, for instance, a table with a slide reciprocally movable therein, in supports of machines, e.g. machine tools etc. The roller bodies may consist of balls or rollers.

In order to prevent dirt from entering the roller body groove or grooves one has tried to arrange seals on the reciprocating structures, said seals covering the ends of the groove. If, however, the two movable structures travel so far relatively to one another that the one structure completely passes past one of the seals, the groove will lie partly open. Now, the invention has for its object to provide a roller guideway mechanism which is sealed in such a manner that the seals, in any position of the movable structures, protect that portion of the groove where the roller bodies are situated. A more specific object of the invention is to provide a roller guideway mechanism having such a state of sealing that a positive pressure in relation to the ambiance may be maintained around the roller bodies.

Hence, the device according to the invention comprises two structures arranged for reciprocal motion in relationship to one another and roller bodies situated in a groove arranged between these structures and is characterized in that seals are arranged in said grooves on either side of the roller bodies, said seals having a shape corresponding to the cross section of the groove and being interconnected so as to follow the roller bodies in the reciprocal motion of the same.

Figure 1:
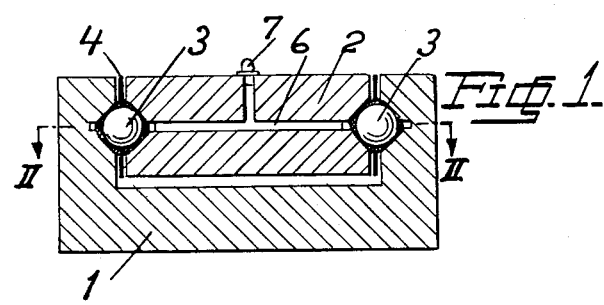
Figure 2A:
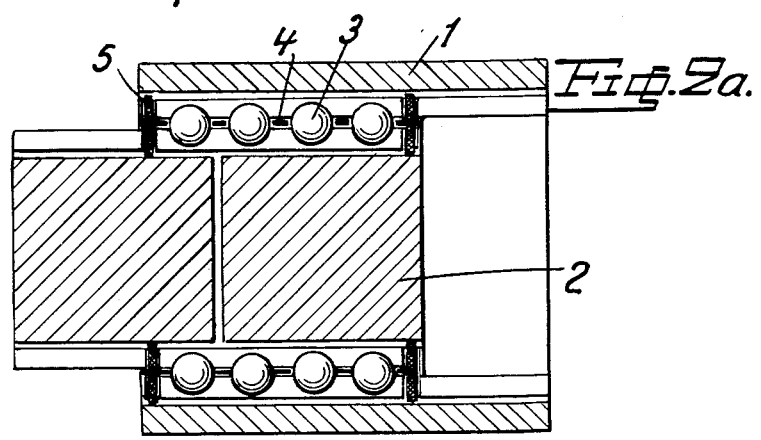
Figure 2B:
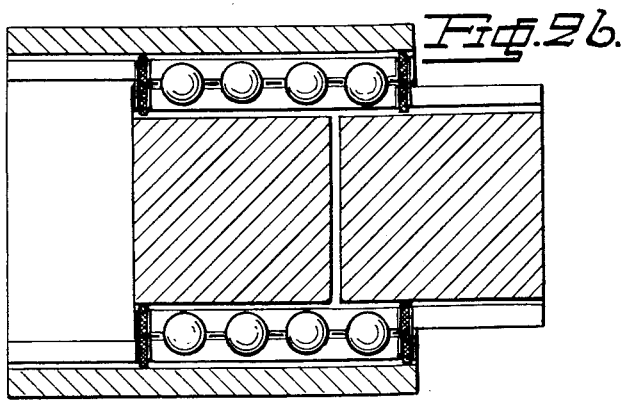

The invention will be disclosed in greater detail in the following with reference to the annexed drawings, wherein FIG. 1 shows a vertical section of a support with a slide movable to and fro in the same, FIGS. 2a and 2b show a section along line II—II in FIG. 1 with a slide in its two limit positions, FIG. 3 shows in perspective how the sealing device according to FIG. 1 may be constructed, FIG. 4 shows a cross section of a roller body groove between two relatively movable structures, there being a different embodiment of the sealing device according to the invention, FIG. 5 shows in perspective how the sealing device according to FIG. 4 may be constructed, and FIG. 6 shows in perspective a modification of the sealing device according to FIG. 5.

The device according to FIGS. 1, 2a and 2b comprises a support 1 and a slide 2 which is arranged movable to and fro in the support. In the walls adjacent the support and slide two grooves are formed and in each groove a set of roller bodies 3 in the form of balls is disposed. Each set of roller bodies is arranged in a roller body retainer 4 consisting of a metal strip provided with holes for the roller bodies and extending into the gap between the support and slide as viewed in FIG. 1. The roller body retainer 4 should have thickness as closely as possible corresponding to the width of the gap between the support 1 and slide 2. At both ends of the roller body retainer seals 5 are attached which have a shape corresponding to the cross section form of the groove. Thus the seals will always follow the roller body retainer in its reciprocating motion and form a satisfactorily tight chamber for the roller bodies. Dirt which may have entered into that portion of the groove which momentarily lies outside the tight chamber formed by the seals will be wiped off by the seals.

The slide 2 is provided with passages 6 and a lubricant nipple 7 for introducing a lubricant into the closed chamber formed by the seals. Sometimes it may be advisable to maintain a positive pressure in the chamber which contains the roller bodies. This may be accomplished by an oil mist being supplied through the pasages 6 under a light positive pressure. The positive pressure may also be generated by the lubricating being carried out in the usual way by means of grease, a gas under positive pressure simultaneously being introduced through separate passages.

FIG. 3 shows on a larger scale and in perspective how the seal may be mounted on the roller body retainer. The roller body retainer 4 is provided with a seal bracket 5a, for instance secured by welding, which is provided with a threaded hole for a screw 8. A first seal element 5 of proper shape is secured to the bracket by means of the screw 8 and a washer 5b. A similar seal is mounted in the same way on the opposite end of the roller body retainer. In assembling, roller bodies are placed in the holes of the roller body retainer and the whole unit is mounted in a groove between the two movable structures.

FIG. 4 shows a cross section of two relatively movable structures 9 and 10 in which a groove is formed containing roller bodies 12, which are situated in holes in a roller body retainer 11. It will be noted, however, that this roller body retainer is considerably thinner than the gap between the movable structures, and it is in no way capable of sealing this gap. For this reason special second sealing members 14 are adapted to seal said gap.

The whole sealing device is more clearly illustrated in FIG. 5. The roller body retainer 11 is provided with holes for the roller bodies and, in addition, a hole 18 through which it is secured to a seal bracket 15 by means of a rivet 19, screw or the like. In doing so the roller body retainer is inserted into a slot 16 in the seal bracket. The ends of the sealing members 14 are inserted into slots 17 in the seal bracket, fitting these slots with a certain clearance. In assembling, the edges of the members 14 are inserted into slots 13 formed in the walls of the two movable structures 9 and 10. The sealing members move in the slots 13 with a certain clearance. A first seal element 20 is secured to the seal bracket 15 by means of a screw 22 and a washer 21 in the same way as described in connection with FIG. 3.

FIG. 6 shows in perspective a modification of the sealing device according to FIG. 5, that is, a device which does not require the presence of a special roller body retainer. In this case the sealing device is formed by two sealing strips 23, whose ends, provided with holes 24, are inserted into slots 25 in a seal bracket 27. The sealing strips are secured in these slots by means of screws 26, suitably in such a way that they are slightly movable in relationship to the seal bracket. The edges of the sealing strips 23 are introduced into slots in the movable structures in the same way as shown with reference to FIGS. 4 and 5. The roller bodies are loosely placed in the frame formed by the two sealing strips 23 and the two seal brackets 24 disposed at the ends of the strips. End seals for the grooves are secured to the seal brackets 27 in the same way as shown in FIGS. 3 and 5.

The seals 5 and 20 shown in FIGS. 3 and 5 should have a certain resilience and a good resistance to wear so as to engage the walls of the groove tightly and resiliently and to prevent efficiently foreign particles from coming in to the roller bodies. As material may be used, for instance, felt, rubber or combinations of rubber and metal.

I claim:
1. In combination with a support and a slide longitudinally movable relative to said support, the adjacent faces of said support and said slide each having oppositely arranged longitudinal grooves therein; a roller bearing and seal assemblage intermediate said slide and said support comprising a frame slidably positioned intermediate the adjacent faces of said slide and said support, and roller bodies arranged within said frame, said roller bodies extending into the grooves of said slide and said support, said frame having first seal means at each end thereof, said first seal means including seal elements having a cross section completely filling the space defined between the oppositely arranged grooves in said support and said slide, said roller bearing and seal assemblage being movable as a unit upon movement of the rollers during reciprocable movement of said slide relative to said support.

2. In combination with a support and a slide longitudinally movable relative to said support, the adjacent faces of said support and said slide each having oppositely arranged longitudinal grooves therein; a roller bearing and seal assemblage intermediate said slide and said support comprising a retainer plate slidably positioned intermediate the adjacent faces of said slide and said support, said retainer plate having a plurality of longitudinally spaced apertures therein, roller bodies arranged in each of said retainer plate apertures, said roller bodies extending into the grooves of said slide and said support, and first seal means secured to each end of said retainer plate, said first seal means including seal elements having a cross section completely filling the space defined between the oppositely arranged grooves in said support and said slide, said roller bearing and seal assemblage being movable as a unit upon movement of the rollers during reciprocable movement of said slide relative to said support.

3. Apparatus as defined in claim 2 wherein the adjacent faces of said support and said slide have oppositely arranged longitudinal slots therein on each side of said longitudinal grooves, and further wherein said roller bearing and seal assemblage includes second sealing members slidably extending into said longitudinal slots, said sealing members being connected at their ends to said first seal means.

4. Apparatus as defined in claim 1 wherein the adjacent faces of said support and said slide have oppositely arranged longitudinal slots therein on each side of said longitudinal grooves, and further wherein the frame of said roller bearing and seal assemblage includes second sealing members slidably extending into said sealing slots, said second sealing members being connected at their ends to said first seal means.

5. Apparatus as defined in claim 4 wherein said second sealing members are of rectangular plate-shaped configuration, the ends of said sealing members being rigidly connected in slots in said first seal means.

References Cited in the file of this patent

UNITED STATES PATENTS

| | | |
|---|---|---|
| 941,673 | Church | Nov. 30, 1909 |
| 1,005,055 | Miller | Oct. 3, 1911 |
| 2,140,983 | Carter | Dec. 20, 1938 |
| 2,626,540 | Eserkaln | Jan. 27, 1953 |
| 2,762,663 | Sloyan | Sept. 11, 1956 |

FOREIGN PATENTS

| | | |
|---|---|---|
| 1,020,962 | France | Nov. 26, 1952 |
| 883,985 | Germany | July 23, 1953 |